US008982071B2

(12) United States Patent
Miki

(10) Patent No.: US 8,982,071 B2
(45) Date of Patent: Mar. 17, 2015

(54) TACTILE SENSATION PROVIDING APPARATUS

(75) Inventor: Tomohiro Miki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 162 days.

(21) Appl. No.: 13/517,383

(22) PCT Filed: Sep. 13, 2010

(86) PCT No.: PCT/JP2010/005577
§ 371 (c)(1),
(2), (4) Date: Jun. 20, 2012

(87) PCT Pub. No.: WO2011/077612
PCT Pub. Date: Jun. 30, 2011

(65) Prior Publication Data
US 2012/0256864 A1    Oct. 11, 2012

(30) Foreign Application Priority Data

Dec. 21, 2009  (JP) ................ 2009-288868

(51) Int. Cl.
  *G06F 3/041* (2006.01)
  *G06F 3/01* (2006.01)
  *G06F 3/0354* (2013.01)
  *G06F 3/038* (2013.01)
(52) U.S. Cl.
  CPC ........... *G06F 3/016* (2013.01); *G06F 3/041* (2013.01); *G06F 3/03547* (2013.01); *G06F 3/038* (2013.01)
  USPC .......................................... 345/173; 395/375
(58) Field of Classification Search
  USPC ............... 178/18.01; 345/157, 168, 173–174; 712/229
  See application file for complete search history.

(56) References Cited

U.S. PATENT DOCUMENTS

| 5,121,488 A * | 6/1992 | Ngai ............................ 712/229 |
| 7,205,978 B2 | 4/2007 | Poupyrev et al. |
| 2001/0017633 A1 | 8/2001 | Sameda et al. |
| 2004/0178996 A1* | 9/2004 | Kurashima et al. ........... 345/173 |
| 2006/0017705 A1* | 1/2006 | Yoshikawa .................... 345/173 |
| 2008/0296072 A1 | 12/2008 | Takashima et al. |
| 2010/0156809 A1* | 6/2010 | Nutaro et al. ................. 345/173 |

FOREIGN PATENT DOCUMENTS

| JP | 2001-236156 A | 8/2001 |
| JP | 2003-288158 A | 10/2003 |
| JP | 2005-284416 A | 10/2005 |
| JP | 2008-130055 A | 6/2008 |
| JP | 2009-032028 A | 2/2009 |

OTHER PUBLICATIONS

International Search Report; PCT/JP2010/005577; Dec. 14, 2010.

* cited by examiner

*Primary Examiner* — Claire X Pappas
*Assistant Examiner* — Abdul-Samad A Adediran
(74) *Attorney, Agent, or Firm* — Studebaker & Brackett PC

(57) ABSTRACT

A tactile sensation providing apparatus includes a touch sensor 11, a detection unit 12, a tactile sensation providing unit 13, a main control unit 16, and a tactile sensation provision control unit 14. The control unit 14 stores a signal related to information from the detection unit in the memory unit and, based on contents thereof and a tactile sensation provision instruction signal from the main control unit 16, determines a state of the main control unit 16. When the instruction signal does not correspond to a busy state, the providing unit 13 vibrates the touch sensor 11 in a first mode, and, when the instruction signal corresponds to the busy state, the control unit 14 controls the main control unit 16 to cancel the process corresponding to the detection information and controls the providing unit 13 to vibrate the touch face 11a in a second mode.

1 Claim, 4 Drawing Sheets

(a)

(b)

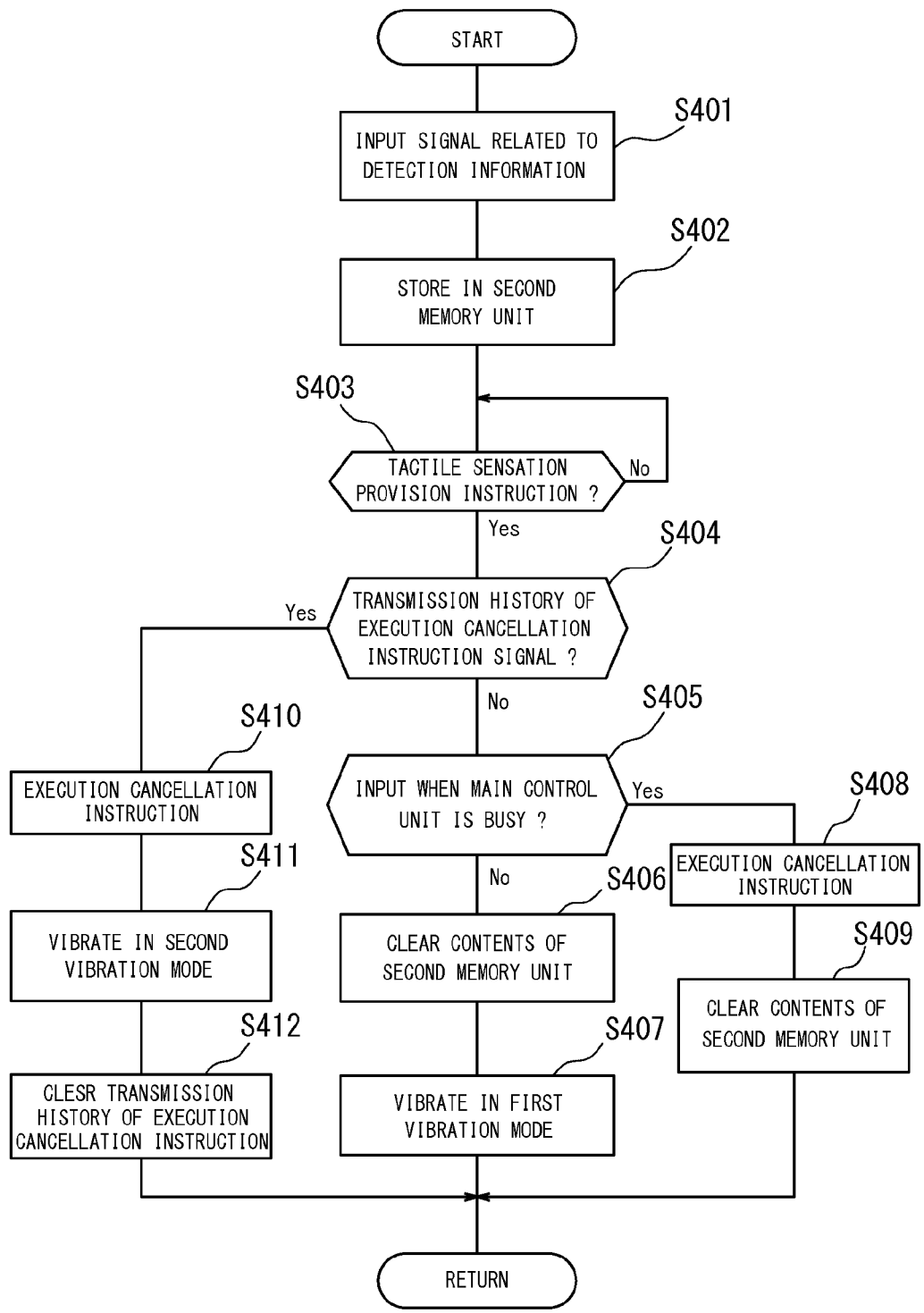

TACTILE SENSATION PROVIDING APPARATUS

CROSS REFERENCE TO RELATED APPLICATION

This application claims priority to and the benefit of Japanese Patent Application No. 2009-288868 filed on Dec. 21, 2009, the entire contents of which are incorporated herein by reference.

TECHNICAL FIELD

The present invention relates to a tactile sensation providing apparatus having a touch sensor.

BACKGROUND ART

In recent years, input apparatus such as operation units, switches and the like having touch sensors such as touch panels, touch switches and the like to receive input operations by users have been widely used for mobile terminals such as mobile phones and gaming machines, information equipment such as calculators and ticket vending machines, home electric appliances such as microwaves, TV sets and lighting equipment, industrial equipment (FA equipment) and the like.

There are known a variety of types of the touch sensors, such as a resistive film type, a capacitive type, an optical type and the like. However, touch sensors of these types receive a touch input (input operation) by a pressing object (pressing means) such as a finger or a stylus pen and, unlike push-button switches, the touch sensors themselves are not physically displaced when being touched.

As such, there is suggested an input apparatus, for example, which has a control unit which monitors an operation to the touch sensor and, when an input is detected, drives a speaker to generate a confirmation sound such that feedback of the input operation is provided (for example, see Patent Document 1). There are also suggested input apparatuses having a control unit which monitors an input to the touch sensor and, when the input is detected, drives a piezoelectric element via a piezoelectric element control unit to vibrate the touch sensor such that a tactile sensation is provided as feedback at operator's fingertip (for example, see Patent Documents 2, 3).

RELATED ART DOCUMENTS

Patent Documents

Patent Document 1: Japanese Patent Laid-Open No. 2009-032028
Patent Document 2: Japanese Patent Laid-Open No. 2003-288158
Patent Document 3: Japanese Patent Laid-Open No. 2008-130055

SUMMARY OF INVENTION

Technical Problem

Incidentally, the input apparatus may take time for data processing. For example, the input apparatus having the touch sensor incorporated in a display device may take time for data processing to change some display panels.

In such a case, even when feedback is provided in response to the detected operation as described above, if the input apparatus may take time for data processing and the display panel is not changed, the operator may misunderstand that the operation is not received and repeat the operation. However, since the control unit is in a busy state at this time, the control unit is not able to control to provide the feedback in response to such a re-operation. Therefore, the operator may misunderstand that the re-operation is not received either and repeat the operation. Even when the touch sensor is not incorporated in the display device, the re-operation may be performed for a similar reason when a processing speed slows down because the control unit is performing data processing for another factor of multitask, for example.

On the other hand, there is an input apparatus which stores, in a memory unit, operation information of an operation performed while the control unit is in the busy state executing data processing and, at a point when the control unit becomes ready to receive an operation, retrieves the operation information stored in the memory unit and sequentially executes operations based on the operation information. This input apparatus, however, regards the operation performed in the busy state as an operation performed to the display panel after change and thus unintended processing may be executed for some input panels before and after change.

In this case, when providing the confirmation sound as feedback as described in the Patent Document 1, for example, the input apparatus may generate a beep sound from the speaker when executing the operation performed in the busy state, in order to notify the operator of execution of the unintended processing. Thereby, the operator may cancel the unintended processing being executed.

When the input apparatus provides the tactile sensation as feedback as described in the Patent Documents 2, 3, however, at a point when the touch sensor is vibrated upon execution of processing for the operation performed in the busy state, the operator may have already removed the pressing object such as the finger from the touch sensor. Hence, the operator is unlikely to notice the vibration of the touch sensor and thus execution of the unintended processing may be continued.

Accordingly, an object of the present invention in consideration of such a problem is to provide the tactile sensation providing apparatus which has excellent usability effectively avoiding execution of the unintended processing.

Solution to Problem

In order to achieve the above object, a tactile sensation providing apparatus according to a first aspect of the present invention includes:
 a touch sensor;
 a detection unit configured to detect an operation to the touch sensor;
 a tactile sensation providing unit configured to vibrate a touch face of the touch sensor;
 a main control unit configured to process data; and
 a tactile sensation provision control unit configured to control drive of the tactile sensation providing unit, wherein
 the main control unit, based on detected information of the detection unit, supplies a tactile sensation provision instruction signal to the tactile sensation provision control unit, and
 the tactile sensation provision control unit includes a memory unit configured to store a signal associated with the detection information from the detection unit and, based on contents of the memory unit and the tactile sensation provision instruction signal supplied from the main control unit, determines a state of the main control unit. The tactile sensation provision control unit controls the tactile sensation providing unit to vibrate the touch face of the touch sensor in a first vibration mode when the tactile sensation provision instruction signal does not correspond to a busy state of the main control unit, controls the main control unit to cancel execution of processing based on the detection information corresponding to the busy state when the tactile sensation provision instruction signal corresponds to the busy state of the main control unit, and also controls the tactile sensation providing unit to vibrate the touch face of the touch sensor in a second vibration mode different from the first vibration mode.

Effect of the Invention

According to the tactile sensation providing apparatus of the present invention, execution of unintended processing for an operation performed in the busy state is effectively prevented. Also, since the operator obtains feedback of a tactile sensation in the second vibration mode different from the first vibration mode, the operator may confirm cancel of a previous operation, to which the tactile sensation in the first vibration mode is not provided as feedback. Therefore, when the operator newly operates after that, desired processing may be smoothly executed, which improves convenience.

BRIEF DESCRIPTION OF DRAWINGS

FIG. 2(a) is a cross-sectional view of a main section, and FIG. 2(b) is a plane view of the main section;

FIG. 4 is a flowchart illustrating an example of a schematic operation of a tactile sensation provision control unit illustrated in FIG. 1.

DESCRIPTION OF EMBODIMENT

An embodiment of the present invention will be described with reference to the accompanying drawings.

Figure 1:
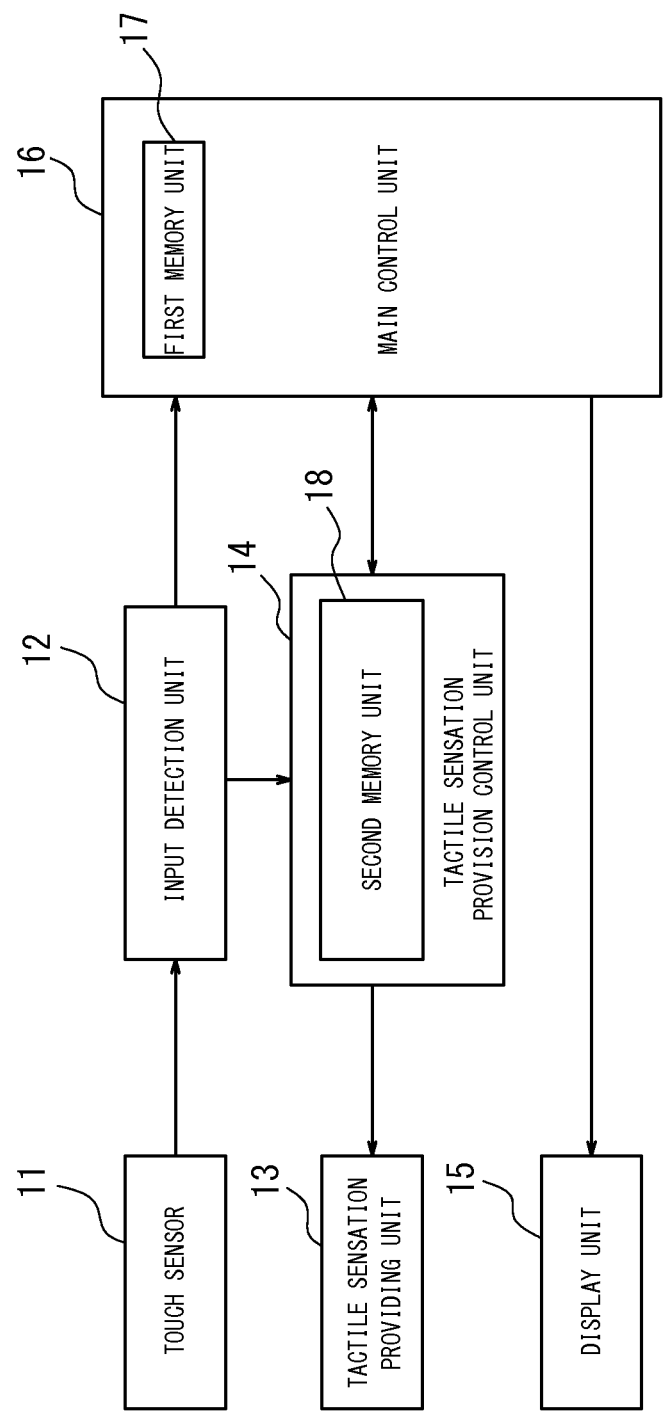
FIG. 1 is a block diagram illustrating a schematic configuration of a tactile sensation providing apparatus according to an embodiment of the present invention.

FIG. 1 is a block diagram illustrating a schematic configuration of a tactile sensation providing apparatus according to the embodiment of the present invention. This tactile sensation providing apparatus includes a touch sensor 11, an input detection unit 12, a tactile sensation providing unit 13, a tactile sensation provision control unit 14, a memory unit 15, and a main control unit 16. The touch sensor 11 is constituted by using a touch panel, a touch switch or the like for receiving a touch input (operation) to the display unit 15 by a pressing means (operation object) such as a finger and the like and may include a known type such as a resistive film type, a capacitive type, an optical type and the like. Input position information corresponding to the operation to a touch face 11a of the touch sensor 11 (see FIG. 2) by the pressing means is detected by the input detection unit 12 based on an output of the touch sensor 11. Then, detection information (for example, a task) corresponding to the operation is supplied to the main control unit 16.

The tactile sensation providing unit 13 vibrates the touch sensor 11 and is constituted by using, for example, a piezoelectric element. The tactile sensation providing unit 13 is driven by the tactile sensation provision control unit 14 based on a tactile sensation provision instruction signal from the main control unit 16. Thereby, the tactile sensation providing unit 13 vibrates the touch sensor 11. The display unit 15 displays a panel based on an application or an OS (Operating System). The display unit 15 displays an input object (touch input panel) such as an input button like a push-button switch (push-type button switch) in the panel. The display unit 15 is constituted by using, for example, a liquid crystal display panel, an organic EL display panel and the like.

The main control unit 16 processes various data. Also, the main control unit 16 processes data corresponding to the detection information from the input detection unit 12 and controls a display operation of the display unit 15 based on the processing.

According to the tactile sensation providing apparatus of the present embodiment, the main control unit 16 includes a first memory unit 17 configured to store the detection information from the input detection unit 12. The main control unit 16 stores the detection information which is input during data processing in the memory unit 17 and, simultaneously, executes processing of the data corresponding to the detection information stored in a sequential manner.

The input detection unit 12 supplies the tactile sensation provision control unit 14 with the detection information of the pressing means detected based on the output of the touch sensor 11 or a signal corresponding thereto, that is, a signal related to the detection information. Also, the tactile sensation provision control unit 14 includes a second memory unit 18 configured to store the signal related to the detection information supplied from the input detection unit 12.

When the tactile sensation provision instruction signal is input from the main control unit 16, the tactile sensation provision control unit 14 determines a state of the main control unit 16 based on the tactile sensation provision instruction signal and contents stored in the second memory unit 18.

As a result, when the tactile sensation provision signal from the main control unit 16 does not correspond to the detection information which is input while the main control unit 16 is in a busy state, that is, when there is no time lag between contents of a tactile sensation provision instruction and the contents of the second memory unit 18, the tactile sensation provision control unit 14 controls the tactile sensation providing unit 13 to vibrate the touch face 11a of the touch sensor 11 in a first vibration mode. Thereby, a tactile sensation is provided as feedback at operator's fingertip in response to the operation (touch input) to the touch face 11a of the touch sensor 11. The time lag set forth above may have a margin.

On the other hand, if the tactile sensation provision instruction signal from the main control unit 16 corresponds to the detection information which is input while the main control unit 16 is in the busy state, that is, when there is the time lag between the contents of the tactile sensation provision instruction and the contents of the second memory unit 18 or when the tactile sensation provision instruction signal does not correspond to the contents stored in series in the second memory unit 18, the tactile sensation provision control unit 14, if necessary, outputs an execution cancellation instruction signal for canceling execution of data processing for an input performed in the busy state. Thereby, the main control unit 16 cancels the data processing and clears the contents of the first memory unit 17. This is not necessary when the main control unit 16 determines that, based on the tactile sensation provision instruction signal and the contents of the second memory unit 18, the data processing has been already canceled.

After determining that the contents of the first memory unit 17 are cleared (canceled) due to the busy state, the tactile sensation provision control unit 14, when the tactile sensation provision instruction signal is input from the main control unit 16, the tactile sensation provision control unit 14 controls the tactile sensation providing unit 13 to vibrate the touch face 11a of the touch sensor 11 in a second vibration mode different from the first vibration mode and outputs the execution cancellation instruction signal for the data processing to the main control unit 16. Thereby, the main control unit 16 cancels execution of the data processing.

The input detection unit 12, the tactile sensation provision instruction unit 14 and the main control unit 16 may be constituted by using software to be executed by an appropriate processor such as a CPU and the like, or by using a dedicated processor (for example, a digital signal processor (DSP)) specialized for each operation.

Figure 2:
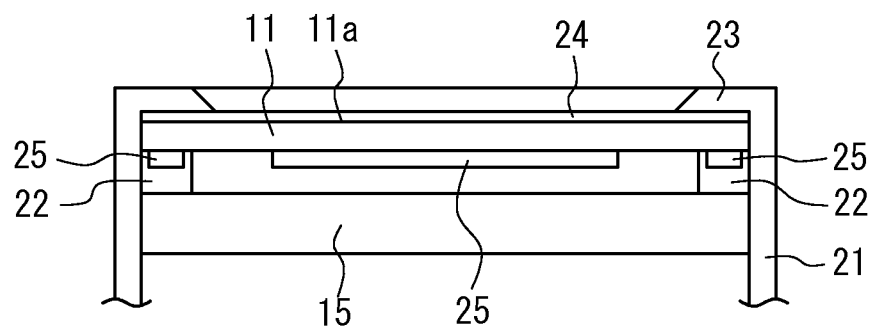
FIG. 2 illustrates an exemplary implementation structure of a touch sensor, a tactile sensation providing unit and a display unit illustrated in FIG. 1.
Figure 2:
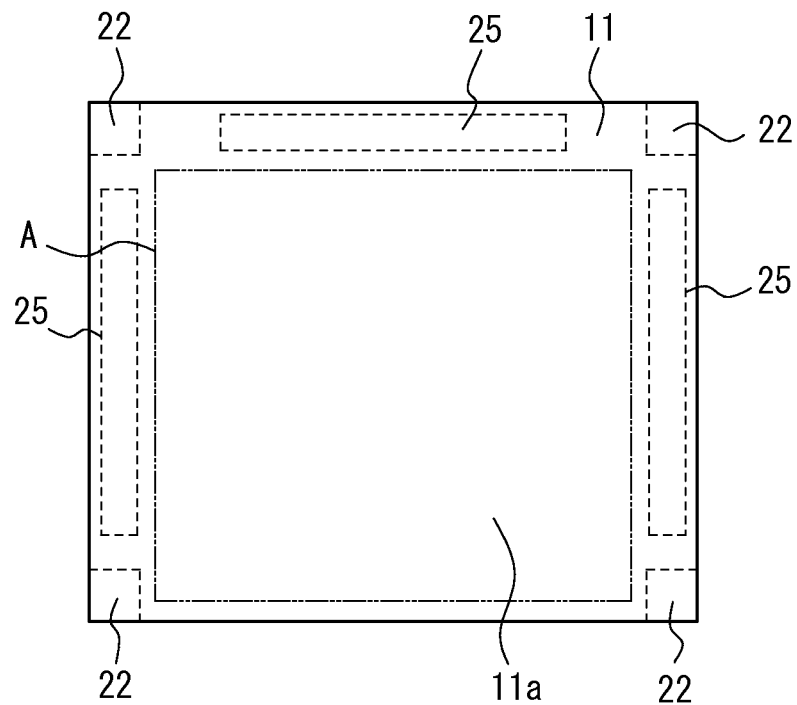

FIG. 2 illustrates an exemplary implementation structure of the touch sensor 11, the tactile sensation providing unit 13 and the display unit 15 illustrated in FIG. 1; FIG. 2(a) is a cross-sectional view of a main section, and FIG. 2(b) is a plane view of the main section. The display unit 15 is contained in a housing 21. The touch sensor 11 is held on the display unit 15 via insulators 22 made of elastic members. According to the present embodiment, the touch sensor 11 is held on the display unit 15 via the insulators 22 arranged at four corners outside a display area A of the display unit 15 indicated by a dashed line in FIG. 2(b).

The housing 21 is provided with an upper cover 23 covering a surface area of the touch sensor 11 outside the display area of the display unit 15. An insulator 24 made of elastic member is arranged between the upper cover 23 and the touch sensor 11.

The touch sensor 11 illustrated in FIG. 2 may have, for example, a surface member having the touch face 11a and constituted by using a transparent film or the glass, and a rear face member made of glass or acryl. The touch sensor 11 is designed such that, when the touch face 11a is pressed down via the insulter 24, a pushed position is bent (strained) slightly in accordance with a pressure force and an entire structure of the touch sensor 11 including the rear face member is also slightly bent.

A piezoelectric element 25 is provided on the rear face of the touch sensor 11 at a position covered by the upper cover 23 and close to one or a plurality of sides (here, for example, three sides). These three piezoelectric elements 25 function as the tactile sensation providing unit 13 to vibrate the touch sensor 11 such that the tactile sensation is provided to the pressing means (operation object) pressing the touch face 11a. These three piezoelectric elements 25 are connected to the tactile sensation provision control unit 14 (see FIG. 1) in parallel. It is to be noted that the housing 21, the upper cover 23 and the insulator 24 illustrated in FIG. 2(a) are omitted in FIG. 2(b).

Next, an operation of the tactile sensation providing apparatus according to the present embodiment will be described.

Figure 3:
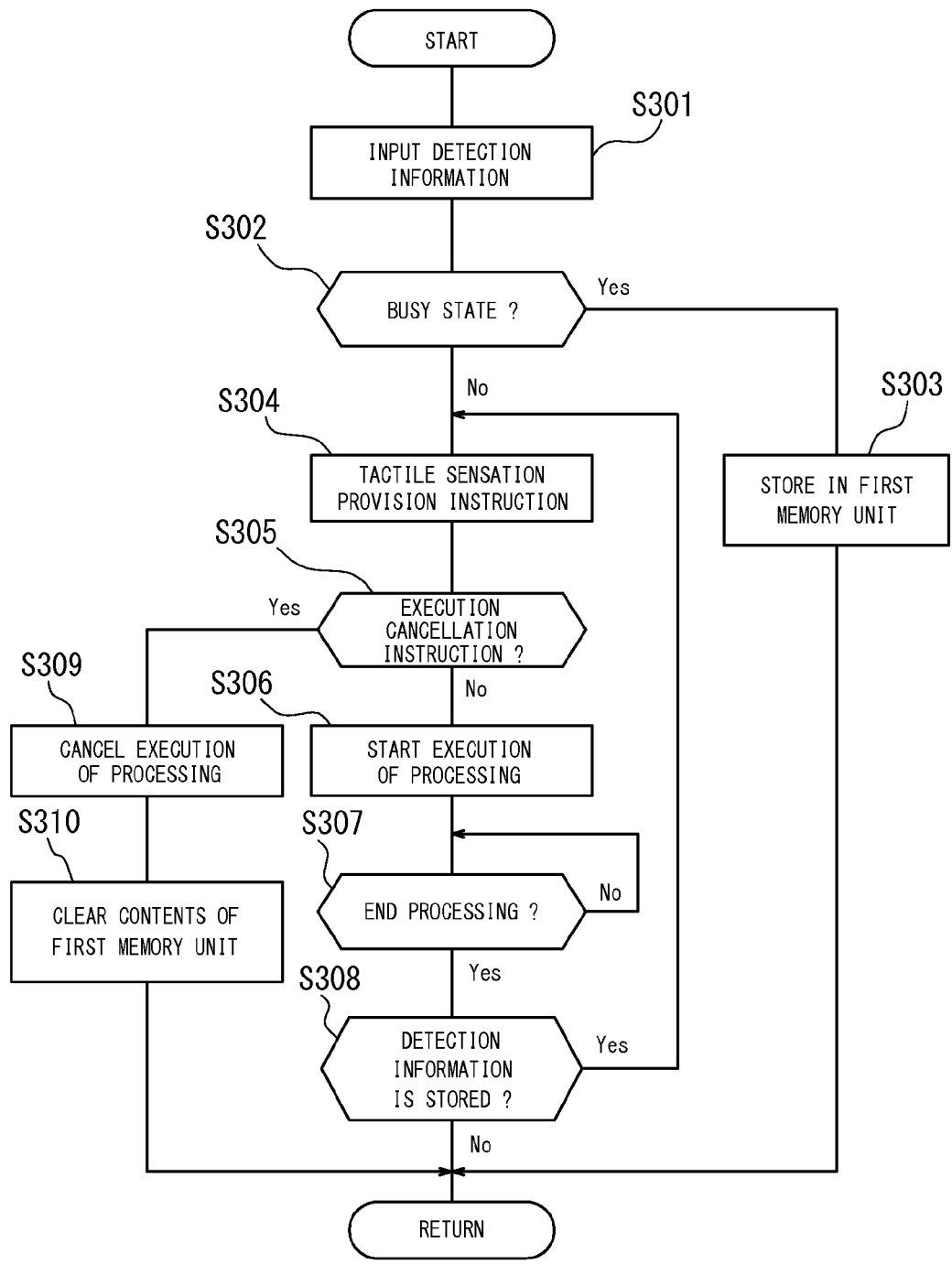
FIG. 3 is a flowchart illustrating an example of a schematic operation of a main control unit illustrated in FIG. 1.

FIG. 3 is a flowchart illustrating an example of a schematic operation of the main control unit 16. When the detection information from the input detection unit 12 is input (step S301), the main control unit 16 determines whether the main control unit 16 is in the busy state (step S302). When the control unit 16 is in the busy state (Yes) as a result, the main control unit 16 stores the detection information in the first memory unit 17 (step S303).

On the other hand, if the main control unit 16 is not in the busy state (No), the main control unit 16 outputs the tactile sensation provision instruction signal to the tactile sensation provision control unit 14 (step S304). Then, the main control unit 16 monitors whether there is the execution cancellation instruction signal from the tactile sensation provision control unit 14 against the tactile sensation provision instruction signal (step S305). When there is no execution cancellation instruction signal (No) as a result, the main control unit 16 starts the data processing corresponding to the detection information (step S306).

Then, when the main control unit 16 ends the data processing (step S307), the main control unit 16 determines whether there is next detection information stored in the first memory unit 17 (step S308). When the next detection information is not stored (No) as a result, the main control unit 16 proceeds to a standby state. When the next detection information is stored (Yes), the main control unit 16 proceeds to step S304 to output the tactile sensation provision instruction signal to the tactile sensation provision control unit 14 in order to start execution of data processing for the next detection information.

On the other hand, when the main control unit 16 detects the execution cancellation instruction signal from the tactile sensation provision control unit 14 at step S305 (Yes), the main control unit 16 cancels the data processing (step S309) and clears the contents of the first memory unit 17 (step S310).

FIG. 4 is a flowchart illustrating an example of a schematic operation of the tactile sensation provision control unit 14. When the signal related to the detection information is input from the input detection unit 12 (step S401), the tactile sensation provision control unit 14 stores the signal in the second memory unit 18 (step S402). Then, when the main control unit 16 inputs the tactile sensation provision instruction signal (step S403), the tactile sensation provision control unit 14 determines whether the tactile sensation provision instruction signal is issued after transmission of the execution cancellation instruction signal to the main control unit 16, based on a transmission history (described below) stored in the second memory unit 18, for example (step S404).

When the tactile sensation provision instruction signal is issued not after transmission of the execution cancellation instruction signal (No) as a result, the tactile sensation provision control unit 14, based on a comparison between the contents of the second memory unit 18 and the tactile sensation provision instruction signal, determines whether the tactile sensation provision instruction signal corresponds to the detection information input while the main control unit 16 is in the busy state (step S405). When the tactile sensation provision instruction signal does not correspond to the detection information input in the busy state (No) as a result, the tactile sensation provision control unit 14 clears the contents of the second memory unit 18 (step S406) and controls the tactile sensation providing unit 13 to vibrate the touch face 11a of the touch sensor 11 in the first vibration mode (step S407) such that the tactile sensation is provided as feedback at operator's fingertip. Thereby, the operator may confirm that the operation is appropriately received.

Here, a vibration pattern in the first vibration mode by the tactile sensation providing unit 13 may be set appropriately by a drive signal applied to the piezoelectric elements 25. For example, in order to provide a click sensation "Cli" obtained when pressing the push-button switch, the drive signal, a sine wave with a predetermined frequency such as 100 Hz to 200 Hz, preferably 170 Hz, is applied to the piezoelectric elements 25 for one cycle such that the touch face 11a is vibrated by approximately 15 μm. Thereby, a realistic click sensation is provided to the operator through the pressing object (pressing means) pressing the touch face 11a of the touch sensor 11, and thus the operator may recognize that the operation is completed. In releasing also, the piezoelectric elements 25 are driven with the drive signal similar to that in pressing, such that a similar click sensation (in this case, a release sensation) is provided. Thereby, a more realistic click sensation including the click sensation "Cli" in pressing and a click sensation "Ck" in releasing may be provided. It is to be understood that the drive signal for providing the release sensation does not need to be identical to that for providing the click sensation. In order to provide a "ticking" sensation harder than the click sensation "Cli", the drive signal, a sine wave or a square wave with a frequency of approximately 200 Hz to 500 Hz, is applied for one cycle.

On the other hand, when the tactile sensation provision instruction signal corresponds to the detection information input in the busy state at step S405 (Yes), the tactile sensation provision control unit 14 transmits the execution cancellation instruction signal to the main control unit 16 (step S408) and clears the contents of the second memory unit 18 (step S409). Upon receiving the execution cancellation instruction signal, the main control unit 16 cancels the data processing corresponding to the tactile sensation provision instruction signal and clears the contents of the first memory unit 17 as described above. The tactile sensation provision control unit 14 stores the transmission history of the execution cancellation instruction signal transmitted to the main control unit 16 in the second memory unit 18, for example.

At step S404, on the other hand, when the tactile sensation provision control unit 14 determines that the tactile sensation provision instruction signal input by the main control unit 16 is issued after transmission of the execution cancellation instruction signal to the main control unit 16 based on the comparison to the contents of the second memory unit 18 (Yes), the tactile sensation provision control unit 14 transmits the execution cancellation instruction signal to the main control unit 16 (step S410). Also, the tactile sensation provision control unit 14 controls the tactile sensation providing unit 13 to vibrate the touch face 11a of the touch sensor 11 in the second vibration mode different from the first vibration mode (step S411) such that a tactile sensation different from that in the first vibration mode is provided as feedback at operator's fingertip. Upon receiving the execution cancellation instruction signal, the main control unit 16 cancels execution of the data processing corresponding to the tactile sensation provision instruction signal, as described above. Since the tactile sensation in the second vibration mode different from that in the first vibration mode is provided as feedback, the operator may recognize cancel of a previous operation to which the tactile sensation in the first vibration mode is not provided as feedback. When the tactile sensation provision control unit 14 controls the tactile sensation providing unit 13 to vibrate in the second vibration mode, the tactile sensation provision control unit 14 clears the transmission history of the execution cancellation instruction signal stored in the second memory unit 18 (step S412).

Here, the vibration pattern in the second vibration mode, in the same manner as that in the first vibration mode, may be set appropriately by the drive signal applied to the piezoelectric elements 25. In order to provide a soft tactile sensation such as, for example, a "throbbing" sensation and a "jelly-like" sensation, the drive signal, a sine wave with a frequency of approximately 200 Hz to 500 Hz, is applied for two or three cycles. Alternatively, in order to provide a "vibrating" sensation, the drive signal, a sine wave with a frequency of approximately 200 Hz to 500 Hz, is applied for four or more cycles. Preferably, information on the drive signals to provide those various tactile sensations is stored in a memory unit (not illustrated) such that a user can appropriately set the drive signal to provide a desired tactile sensation. The tactile sensations such as "Cli" and "Ck", the "throbbing" sensation, the "jelly-like" sensation and the "vibrating" sensation set forth in the present specification are Japanese expressions of the sensations obtained by the operator. Examples of the drive signals to provide actual tactile sensations are described above.

According to the tactile sensation providing apparatus of the present embodiment, as described above, when the main control unit 16 executes data processing based on the detection information stored in the first memory unit 17 during execution of other data processing, that is, while in the busy state, the data processing is canceled based on the execution cancellation instruction signal from the tactile sensation provision control unit 14 and the contents of the first memory unit 17 are cleared. Then, when the main control unit 16, after determining that the contents of the first memory unit 17 are cleared (canceled) due to the busy state, executes the processing based on the detection information, the tactile sensation providing unit 13 vibrates the touch face 11a of the touch sensor 11 in the second vibration mode different from the first vibration mode and the main control unit 16 cancels execution of the data processing.

Accordingly, execution of unintended processing by an operation in the busy state is effectively prevented. Also, the operator, through feedback of the tactile sensation in the second vibration mode different from the first vibration mode, may recognize cancel of a previous operation, to which the tactile sensation in the first vibration mode is not provided as feedback. Therefore, when an operation is performed thereafter, desired processing is smoothly executed, which improves convenience.

It is to be understood that the present invention is not limited to the above embodiment but may be modified or varied in a multiple of manners. For example, although the touch sensor 11 is integrally provided on the display unit 15 in the above embodiment, the present invention is applicable also to a configuration in which those units are spatially separated from each other, or a configuration in which the display unit 15 is omitted.

REFERENCE SIGNS LIST 11 touch sensor
11a touch face
12 input detection unit
13 tactile sensation providing unit
14 tactile sensation provision control unit
16 main control unit
17 first memory unit
18 second memory unit

The invention claimed is:
1. A tactile sensation providing apparatus comprising:
a touch sensor;
a detection unit configured to detect an operation to the touch sensor;
a tactile sensation providing unit configured to vibrate a touch face of the touch sensor;
a main control unit configured to process data; and
a tactile sensation provision control unit configured to control drive of the tactile sensation providing unit, wherein
the main control unit, based on detected information of the detection unit, supplies a tactile sensation provision instruction signal to the tactile sensation provision control unit, and the tactile sensation provision control unit includes a memory unit configured to store a signal associated with the detection information from the detection unit and, based on a comparison of the contents of the memory unit and the tactile sensation provision instruction signal supplied from the main control unit, determines correspondence to a busy state of the main control unit, wherein, only when the tactile sensation provision instruction signal does not correspond to a busy state of the main control unit, the tactile sensation provision control unit controls the tactile sensation providing unit to vibrate the touch face of the touch sensor in a first vibration mode, and only when the tactile sensation provision instruction signal corresponds to the busy state of the main control unit, the tactile sensation provision control unit controls the main control unit to cancel execution of processing based on the detection information corresponding to the busy state, and also controls the tactile sensation providing unit to vibrate the touch face of the touch sensor in a second vibration mode different from the first vibration mode.

* * * * *